(12) United States Patent
Baudendistel et al.

(10) Patent No.: US 9,388,592 B2
(45) Date of Patent: Jul. 12, 2016

(54) METHODS OF UNDERWATER SEAMING

(71) Applicant: Latham Pool Products, Inc., Latham, NY (US)

(72) Inventors: Theodore F. Baudendistel, Hampton Cove, AL (US); Richard E. Black, Jr., Fayetteville, TN (US)

(73) Assignee: Latham Pool Products, Inc., Latham, NY (US)

( * ) Notice: Subject to any disclaimer, the term of this patent is extended or adjusted under 35 U.S.C. 154(b) by 317 days.

(21) Appl. No.: 14/231,366

(22) Filed: Mar. 31, 2014

(65) Prior Publication Data

US 2015/0275536 A1 Oct. 1, 2015

(51) Int. Cl.
| | |
|---|---|
| *E04B 2/00* | (2006.01) |
| *E04F 13/00* | (2006.01) |
| *B32B 7/08* | (2006.01) |
| *B29C 65/00* | (2006.01) |
| *B32B 37/00* | (2006.01) |
| *E04F 13/08* | (2006.01) |
| *C09J 7/02* | (2006.01) |
| *B32B 27/00* | (2006.01) |
| *E04H 4/00* | (2006.01) |
| *B29C 65/48* | (2006.01) |
| *B29C 65/56* | (2006.01) |
| *B29C 65/72* | (2006.01) |
| *B32B 27/04* | (2006.01) |

(52) U.S. Cl.
CPC ............ *E04H 4/0031* (2013.01); *B29C 65/483* (2013.01); *B29C 65/561* (2013.01); *B29C 65/72* (2013.01); *B29C 66/12* (2013.01); *B29C 66/7212* (2013.01); *B32B 27/04* (2013.01); *E04H 2004/0068* (2013.01)

(58) Field of Classification Search
CPC ...... B29C 65/00; B29C 65/48; B29C 65/483; B29C 65/56; B29C 65/561; B29C 65/72; B29C 66/00; B29C 66/05; B29C 66/12; B29C 66/128; B29C 66/1282; B29C 66/3032; B29C 66/721; B29C 66/7212; Y10T 428/24777; B32B 2607/00; B32B 27/04; B32B 37/12
USPC ......... 156/60, 71, 91, 92, 242, 245, 293, 297, 156/298, 299, 303.1, 304.1, 325, 326, 327, 156/329, 332
See application file for complete search history.

(56) References Cited

U.S. PATENT DOCUMENTS

| | | |
|---|---|---|
| 3,602,925 A | 9/1971 | Thompson |
| 3,693,194 A | 9/1972 | Schindler et al. |
| 3,720,964 A | 3/1973 | Thomson |
| 3,745,727 A | 7/1973 | Chichester, Sr. |

(Continued)

*Primary Examiner* — Philip Tucker
*Assistant Examiner* — Brian R Slawski
(74) *Attorney, Agent, or Firm* — Kilpatrick Townsend & Stockton LLP

(57) ABSTRACT

A method of seaming together two fiberglass pool components can include providing a first fiberglass pool component having a first edge. The method can also include providing a second fiberglass pool component having a second edge. A first tongue can extend from the first edge. A second tongue can extend from the second edge. The method can also include applying a first adhesive to a top surface of the first tongue and positioning a bottom surface of the second tongue on the first adhesive. A second adhesive can be applied on a top surface of the second tongue. A tile or tiles can be positioned on the second adhesive. A silicone sealant or a silicone grout can be applied between the tile and the first edge; and between the tile and the second edge.

14 Claims, 5 Drawing Sheets

(56) References Cited

U.S. PATENT DOCUMENTS

| | | |
|---|---|---|
| 3,859,674 A | 1/1975 | Thomson |
| 3,939,504 A | 2/1976 | Linecker |
| 4,948,296 A | 8/1990 | Salter |
| 5,350,202 A | 9/1994 | Fritz et al. |
| 5,606,831 A | 3/1997 | Tippmann et al. |
| 6,558,535 B2 | 5/2003 | Berg et al. |
| 8,136,177 B2 | 3/2012 | Kan |
| 2006/0207008 A1 | 9/2006 | Stancill |
| 2008/0078016 A1 | 4/2008 | Cox |
| 2008/0134426 A1 | 6/2008 | Cronise et al. |

METHODS OF UNDERWATER SEAMING

FIELD OF THE INVENTION

Embodiments of the present invention relate generally to methods of seaming together fiberglass pool elements into a single poolscape.

BACKGROUND

Fiberglass pools are manufactured at one location and then shipped in their fabricated condition for installation at a desired location. The installation site includes an excavated hole which corresponds in shape and size to the fabricated fiberglass pool. The pool components are shipped by truck, and the Department of Transportation ("DOT") rules generally limit the width of loads on roadways to 16 feet wide. Exceptions are allowed but are cost prohibitive. Consequently, the size and shape of fiberglass pools are typically limited to the 16 feet width imposed by the DOT. Non-fiberglass pools, such as concrete pools constructed on-site, are not width restricted and are available in a variety of pool shapes and sizes.

In an effort to create a variety of shapes and sizes of fiberglass pools, installers have used a method in which two fiberglass pool elements are shipped to the installation site and then bolted together at the installation site by using a vertical flange joint. This method of construction requires excavating a hole with a recessed area that corresponds exactly with the size and shape of the vertical flange joint. It also requires access to the underside of the pool elements to create the vertical flange joint, which can be difficult in a work site setting. This and other prior art methods of construction require bolting together multiple panels and require careful alignment of the flange and gasket to form multiple watertight seals. In other prior art, multiple tongue and groove joints were used. Assembling the multiple tongue and groove joints together at a worksite can be time consuming as well as problematic.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of this invention relate to methods of seaming together fabricated fiberglass pool elements, into a single poolscape without using vertical flanges or rubber gaskets and without requiring any special recesses in the excavation created to receive the fiberglass pool. By creating a watertight underwater seal between two fabricated fiberglass pool elements, the fiberglass pool customer is no longer limited by the 16 foot wide limitation imposed by the DOT. Embodiments of this invention provide an easy installation method, which may be performed in the field by a construction worker.

In one embodiment, a method of seaming together two fiberglass pool components is disclosed. The method can include providing a first fiberglass pool component having a first edge and a second fiberglass pool component having a second edge. A first tongue can extend from the first edge. A second tongue can extend from the second edge. The method can also include applying a first adhesive to a top surface of the first tongue and positioning the second tongue on top of the first adhesive. A second adhesive can be applied on a top surface of the second tongue. A plurality of glass, ceramic or others tiles can be positioned on top of the second adhesive. A silicone sealant can be applied between the plurality of tiles. A silicone grout or a silicone sealant can also be applied between the tiles and the first edge; and between the tiles and the second edge.

BRIEF DESCRIPTION OF THE DRAWINGS

Illustrative embodiments of the present invention are described in detail below with reference to the following drawing figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
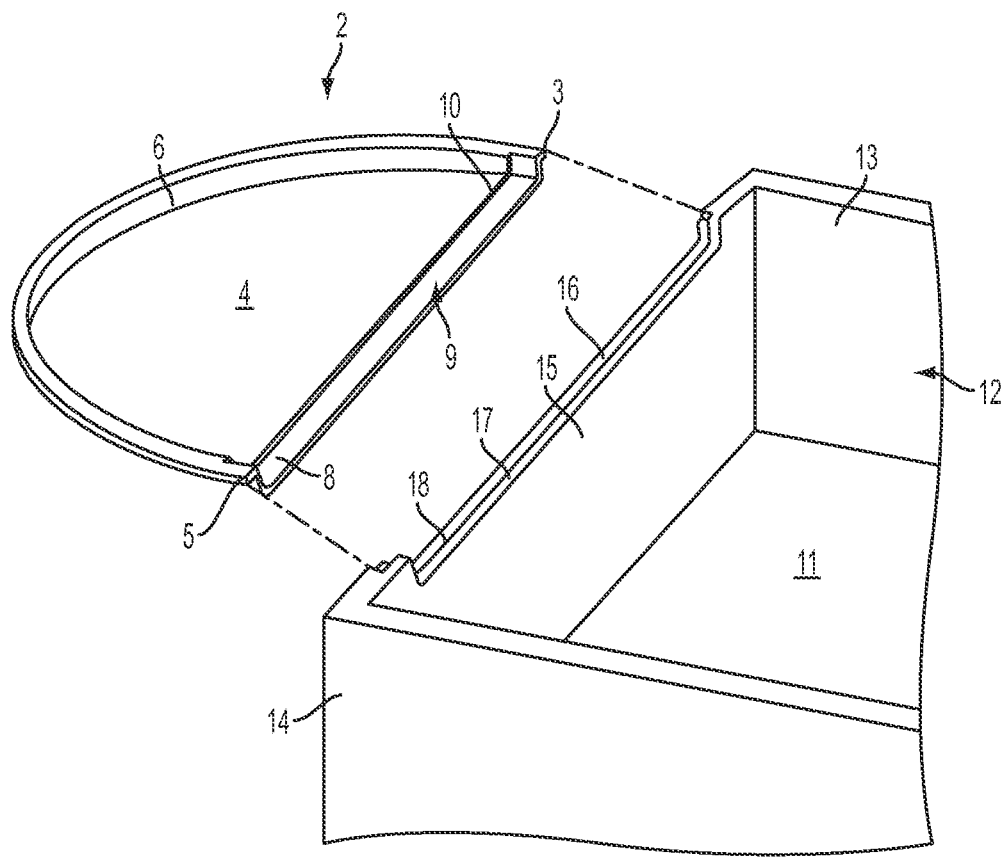
FIG. 1 is a perspective view of two fiberglass pool elements.

The embodiment shown in FIG. 1 includes a first fabricated fiberglass pool element 2 and a second fabricated fiberglass pool element 12. The first fabricated fiberglass pool element 2 has a semi-circular first pool floor 4 that can alternatively be any other suitable shape. A raised side 6 extends upwards from the pool floor 4 around only the curved portion of the semi-circular pool floor 4. The edge 10 of the pool floor 4 between the ends 3, 5 of the curved wall 6 is straight and includes a recess 9 having an upward-facing horizontal surface that forms a first tongue 8. The first tongue 8 may be approximately four inches wide and lies approximately ¼ inch below the adjacent pool floor 4, although other suitable widths and recesses may be used provided that they supply the needed strength, shape and dimensions to accomplish, among other things, the provision of easily-installed, strong and attractive pool structures. For instance, the depth of the recess 9 might desirably be greater if thicker tiles or other decorative or sealing elements are employed.

The second fabricated fiberglass pool element 12 includes raised sides 13, 14, 15 extending upwardly from a pool bottom 11. The side 15 of the second pool element that is to mate with semicircular pool element 2 has a recess defined by a ledge 17 that will be co-planar with the bottom 4 of the first fabricated fiberglass pool element 2 when the two pool elements 2 and 12 are assembled and installed. Ledge 17 includes an edge 18, below which a second tongue or horizontal portion 16 protrudes. The second tongue 16 may also be approximately four inches wide.

Figure 2:
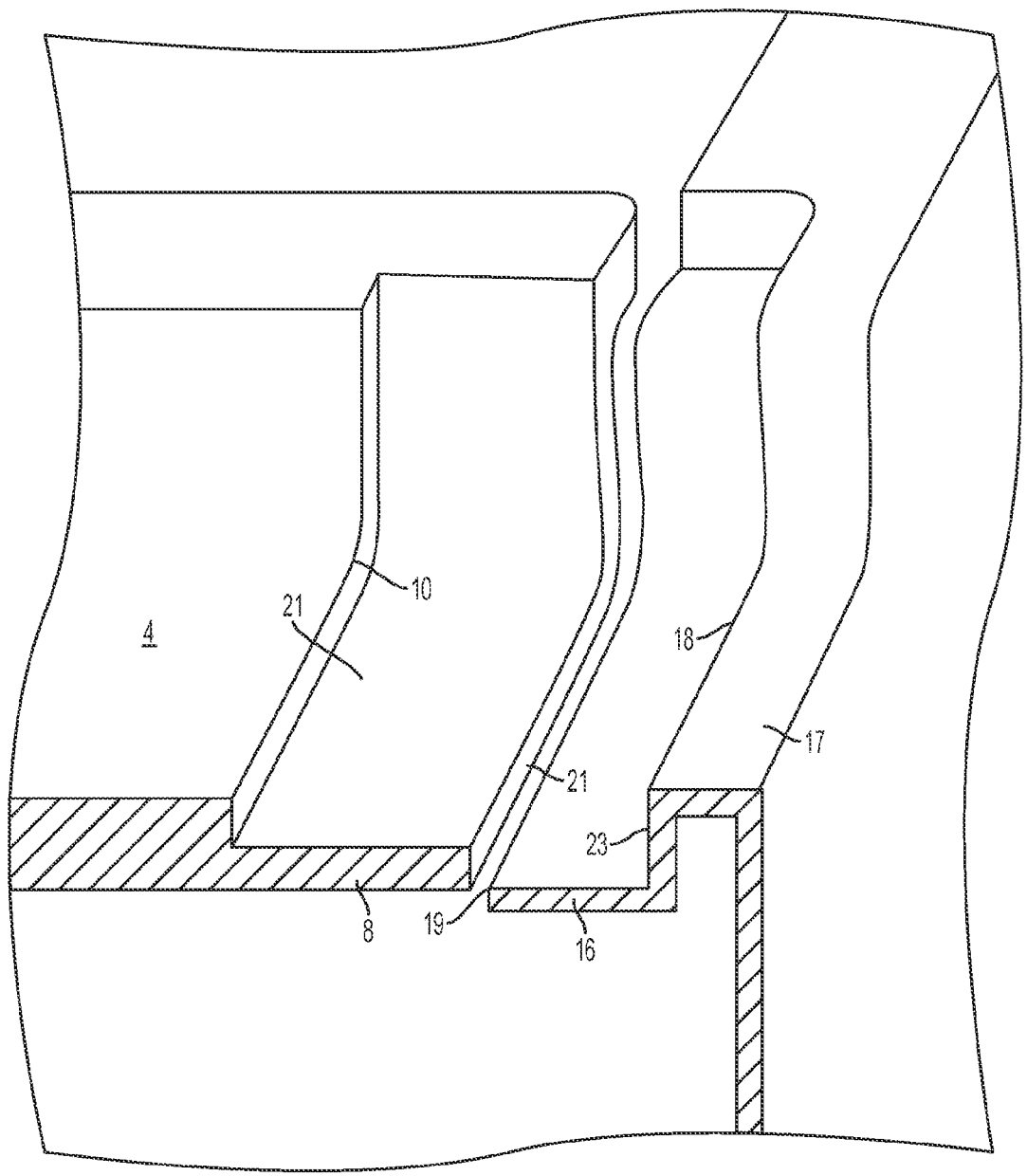
FIG. 2 is an enlarged isometric view, in section, of a portion of a first tongue and a second tongue of the two fiberglass pool elements of FIG. 1.

As shown in FIG. 2, the first tongue 8 is approximately the same width and thickness as the second tongue 16. The second tongue 16 lies below the first tongue 8. In other words, a top surface of the second tongue 16 is positioned lower than the first tongue 8 by an amount equal to the thickness of the first tongue 8. This may mean, for instance that the second tongue 16 is approximately ½ inch below the ledge 17 if the first tongue 8 is ¼ inch thick. In other words, the first tongue 8 and the second protruding tongue 16 are shaped and sized such that when the first tongue 8 is positioned on top of the second tongue 16 the outer edge 19 of the second tongue 16 is positioned below the outer edge 10 of the pool bottom 4. The tongues 8, 16 are shaped and sized such that when the first tongue 8 is positioned on top of the second tongue 16 the outer edge 21 of the first tongue 8 contacts the side wall 23 of the ledge 17. As described in more detail below with respect to FIG. 3, when the first tongue 8 is positioned on top of the second tongue 16, the edges 10 and 18 are in the same plane (e.g. are positioned at the same height relative to one another). Similarly, the pool bottom 4 and the ledge 17 are also positioned within the same plane.

Figure 3:
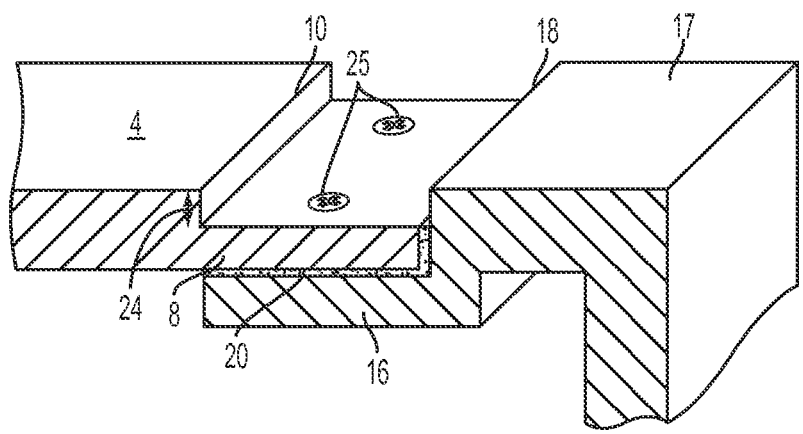
FIG. 3 is a cross-sectional side view of the second tongue installed on a top surface of the first tongue.

As shown in FIG. 3, an adhesive 20 is applied to a top surface of the second tongue 16. The adhesive 20 may be methylmethacrylate or any other suitable adhesive. After the application of the adhesive 20 the first tongue 8 is aligned on the top surface of the second tongue 16. The first tongue 8 and the second tongue 16 are pressed together while the adhesive 20 cures. Self-tapping galvanized stainless steel, bronze or other corrosion-resistant screws 25 can be installed at appropriate intervals to mechanically hold the tongues 16, 8 in place while the adhesive 20 cures. In other embodiments other suitable means may be used for retaining the tongues 8, 16 and in place while the adhesive 20 cures. Once cured, the adhesive 20 bonds the two tongues 8, 16 together. As shown in FIG. 3, when the two tongues 8, 16 are bonded together, the outer edges 10, 18 lay in the same plane. Similarly, the pool bottom 4 and the ledge 17 are also positioned in the same plane. A gap or space 24 exists between a top surface of the first tongue 8 and the edges 10, 18.

Figure 4:
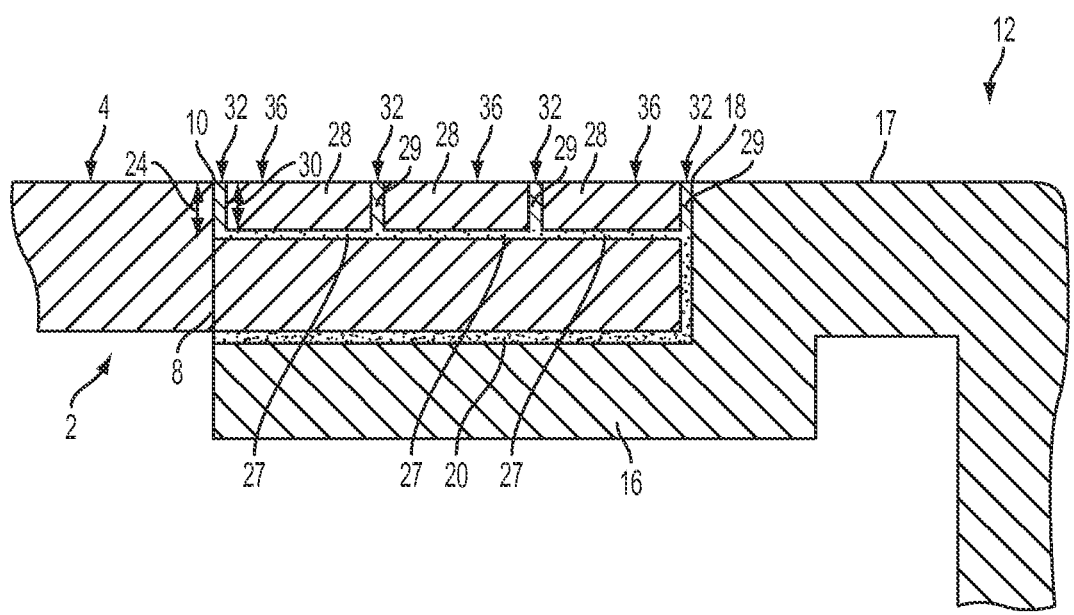
FIG. 4 is a cross-sectional side view of the seam joining the two fiberglass pool elements of FIG. 3 with tiles positioned on the second tongue.

As shown in FIG. 4, once the first and second tongues 8, 16 have been bonded together, tiles 28 are installed on the top surface of the first tongue 8. The tiles 28 can be ceramic or glass or other tiles designed for or suitable for use in a swimming pool environment. For example, the tiles 28 may be acid resistant and frost proof. The tiles 28 are installed by applying an adhesive 27 on the top surface of the first tongue 8. The adhesive 27 can be a silicone adhesive or other suitable adhesive. The tiles 28 are positioned on the adhesive 27 in sufficient quantity to extend between the edge 10 and the edge 18. As shown in FIG. 4, the thickness 30 of each of the tiles 28 is approximately equal to the depth of the gap 24. For example, in the embodiment shown in FIG. 4, the tiles 28 have a thickness of approximately ¼ inch. The tiles 28 thereby fit within the gap 24 such that the top surface 36 of the tiles 28 lay flush with the edges 10, 18. Similarly, the top surface 36 of the tiles 28 lay flush with the pool bottom 4 and the ledge 17. In one embodiment a two inch wide ceramic tile is used, though any suitable width of tile may be used. A silicone grout or silicone sealant 29 is applied in the spaces 32 between each of the tiles 28 and the outer edges 10, 18 and the tiles 28. The tile 28, the adhesive 27, and the silicone grout 29 create additional watertight sealant protection.

Figure 5:
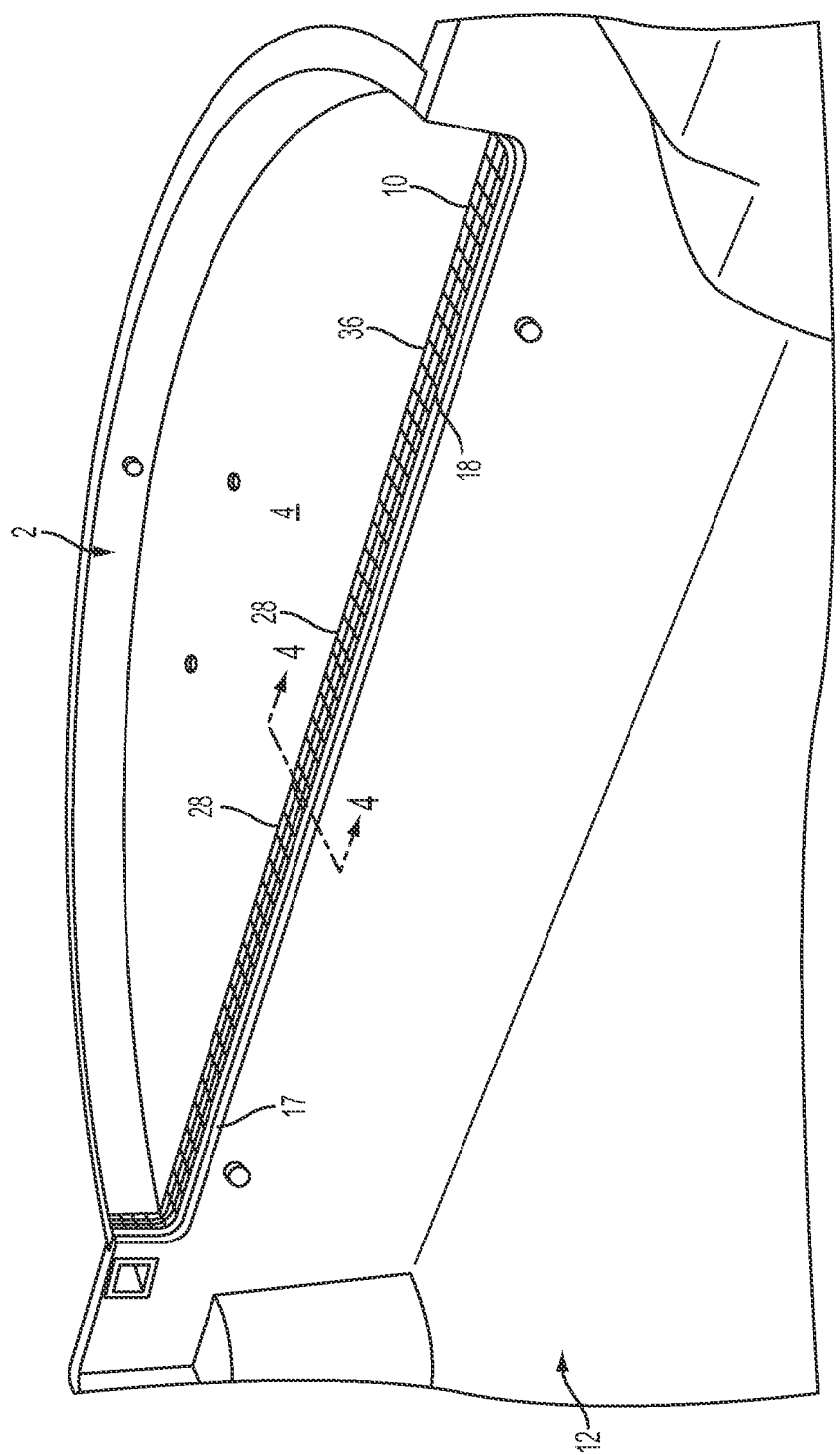
FIG. 5 is a perspective view of the two fiberglass pool elements of FIG. 1 seamed together.

As shown in FIG. 5, the resulting poolscape includes first pool element 2 that is a tanning ledge, and a second pool element 12, seamed together. In other embodiments a sunken bar, a spa, or any other suitable pool feature may be used in place of a tanning ledge. As shown, the top surface 36 of the tiles 28 lay substantially within the same plane as the edges 10, 18 and the pool bottom 4 and ledge 17. The majority of the seam between the first and second pool elements 2, 12 is water sealed by the adhesive 20 between the first and second tongues 8, 16. The seam is provided additional water sealant protection by installation of the tiles 28 with the adhesive and the silicone sealant or grout or other appropriate sealant or grout. The majority of the seam between the first and second pool elements 2, 12 is a horizontal seam. A horizontal seam provides additional benefits in that the weight of the water in the poolscape forces the pool elements together against the backfill material under the seam. This pressure can reinforce the seam.

As shown in the embodiment in FIGS. 1-6, the top surface 36 of the tiles 28 lays flush with the pool bottom 4 of the first pool element 2 and ledge 17. In this manner, the pool bottom 4 flows from the first pool element 2 to the ledge 17 of the second pool element 12, without bumps or edges or other impediments that could cause a user to trip or upon which debris may become lodged. The weight of water in a filled poolscape exerts a constant downward force that reinforces the horizontal seam. The use of tiles 28 installed by using adhesive 27 under the tiles (which may be a silicone based adhesive or any other adhesive appropriate for attaching ceramic or other tiles) and grout or sealant 29 (which may be silicone grout or sealant or any other grout or sealant suitable for use between ceramic or other tiles) between the tiles can provide water-seal protection as well as providing a pleasant design for of the pool.

The final poolscape shown in FIG. 5 may exceed the 16 foot limit imposed by the DOT width limits. In addition, the shape of the final poolscape may be altered beyond the standard shape of a single fabricated pool element that is shipped and installed on site. The ability to create a poolscape that is both wider than 16 feet and that is available in a variety of shapes is desirable to a consumer seeking a custom product. As shown in FIG. 5, the final pool scape can be formed using a single seam or joint that can be hidden from view beneath the tiles.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

Figure 6:
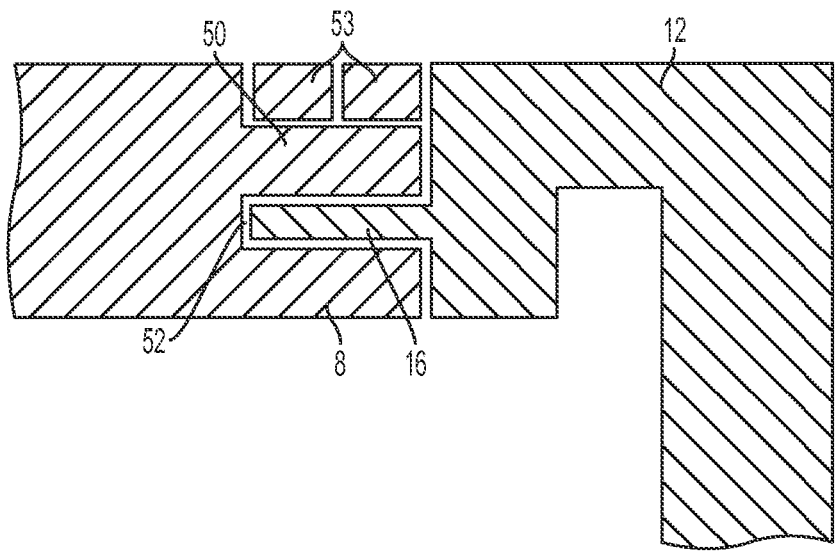
FIG. 6 is an alternative tongue and groove embodiment.

For instance, as shown in FIG. 6, an additional protruding plate or tongue 50 can be positioned above or below the first tongue 8 and can define a groove 52 into which the second tongue 16 of the other pool member 12 is inserted, thereby forming a horizontal "tongue and groove joint." Tiles 53 can be positioned on top f the additional tongue 50 as described in this application. In another alternative, an additional tongue could be positioned above or below the second tongue 16 such that the first tongue 8 could be inserted into the groove formed by the tongue 16 and the additional tongue.

Figure 7:
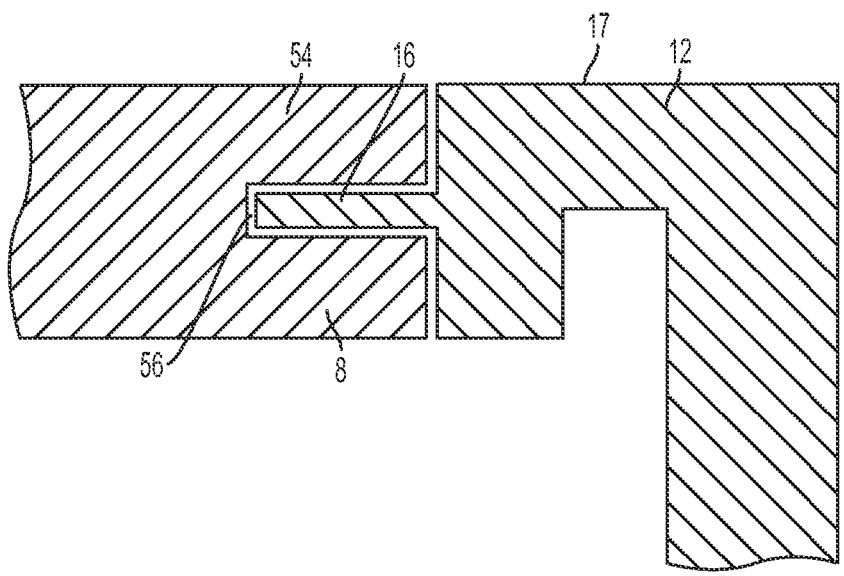
FIG. 7 is another tongue and groove embodiment.

In addition, as shown in FIG. 7, in another aspect of the present disclosure, an additional protruding plate or tongue 54 can be positioned above the first tongue 8 and can define a groove 56 into which the second tongue 16 on the other pool member 12 is inserted, thereby forming a horizontal "tongue and groove joint." The first tongue 8, the additional tongue 54 and the second tongue 16 can be positioned relative to one another such that a top surface of the additional tongue 54 lies within the same plane as the ledge 17.

That which is claimed is:

1. A method of seaming together two fiberglass pool components, the method comprising the steps of:
   (a) providing a first fiberglass pool component having a first edge;
   (b) providing a second fiberglass pool component having a second edge;
   (c) providing a first tongue extending from the first edge;
   (d) providing a second tongue extending from the second edge;
   (e) applying a first adhesive to a top surface of the first tongue;
   (f) positioning a bottom surface of the second tongue on the first adhesive;
   (g) applying a second adhesive on a top surface of the second tongue;
   (h) positioning a tile on the second adhesive;
   (i) applying at least one of a silicone sealant or a silicone grout between the tile and the first edge and between the tile and the second edge.

2. The method of claim 1, further comprising the step of inserting a plurality of screws through the first tongue and the second tongue such that the screws retain the first tongue and the second tongue in place until the first adhesive has cured.

3. The method of claim 1, wherein the step of providing a first tongue extending from the first edge further comprises providing a first tongue extending approximately four inches wide.

4. The method of claim 1, wherein the step of providing a first tongue extending from the first edge further comprises providing a first tongue positioned approximately ½ inch below the first edge.

5. The method of claim 1, wherein the step of providing a first tongue extending from the first edge further comprises providing a first tongue having a width approximately equal to a width of the second tongue.

6. The method of claim 1, wherein the step of applying a first adhesive to a top surface of the first tongue further comprises applying the adhesive methylmethacrylate.

7. The method of claim 1, wherein the step of applying a second adhesive on a top surface of the second tongue further comprises applying a silicone adhesive.

8. The method of claim 1, further comprising the step of applying pressure on the top surface of the second tongue to force the second tongue and the first tongue together.

9. The method of claim 1, wherein the step of positioning a tile or tiles on the second adhesive further comprises positioning a tile or tiles having a thickness approximately equal to a gap between the top surface of the second tongue and the first edge of the first fiberglass pool component.

10. The method of claim 1, wherein the step of positioning a tile or tiles on the second adhesive further comprises positioning a tile or tiles such that the tile substantially extends a width of the second tongue.

11. A method of seaming together two fiberglass pool components, the method comprising the steps of:
    (a) providing a first fiberglass pool component having a first edge;
    (b) providing a second fiberglass pool component having a second edge;
    (c) providing a first tongue extending from the first edge;
    (d) providing a second tongue extending from the second edge;
    (e) applying a first adhesive to a top surface of the first tongue;
    (f) positioning a bottom surface of the second tongue on the first adhesive;
    (g) inserting at least one screw through the second tongue and the first tongue, for retaining the second tongue and the first tongue in place until the first adhesive cures;
    (h) applying a silicone adhesive on a top surface of the second tongue;
    (i) positioning a tile or tiles on the second adhesive, the thickness of the tile extending from the top surface of the second tongue to the first edge;
    (j) applying at least one of a silicone sealant or silicone grout between the tile or tiles and the first edge and between the tile or tiles and the second edge.

12. The method of claim 11, wherein the step of providing a first tongue extending from the first edge further comprises providing a first tongue extending approximately four inches wide.

13. The method of claim 11, wherein the step of providing a first tongue extending from the first edge further comprises providing a first tongue positioned approximately ½ inch below the first edge.

14. The method of claim 11, wherein the step of providing a second tongue extending from the second edge further comprises providing a second tongue positioned approximately ¼ inch below the second edge.

* * * * *